United States Patent
Eslambolchi et al.

(10) Patent No.: US 7,505,567 B1
(45) Date of Patent: Mar. 17, 2009

(54) METHOD FOR PROVIDING DETECTION OF FAULT LOCATION FOR DEFECT CALLS IN A VOIP NETWORK

(75) Inventors: Hossein Eslambolchi, Los Altos, CA (US); John McCanuel, Bailey, CO (US); Paritosh Bajpay, Edison, NJ (US); David Lu, Morganville, NJ (US); Zhijian Xu, Duluth, GA (US); Li-Jun W. Chung, Lincroft, NJ (US); Jeffrey Stein, Cliffwood, NJ (US); Richard Farel, Englishtown, NJ (US)

(73) Assignee: AT&T Corp., New York, NY (US)

( * ) Notice: Subject to any disclaimer, the term of this patent is extended or adjusted under 35 U.S.C. 154(b) by 116 days.

(21) Appl. No.: 11/321,036

(22) Filed: Dec. 30, 2005

(51) Int. Cl.
*H04M 1/24* (2006.01)

(52) U.S. Cl. .................... 379/14.01; 370/352; 370/248; 379/9.03; 379/9.04; 379/33

(58) Field of Classification Search ............... 370/351, 370/352, 248; 379/219, 14.01, 9, 9.03, 9.04, 379/33
See application file for complete search history.

(56) References Cited

U.S. PATENT DOCUMENTS

| | | | |
|---|---|---|---|
| 6,993,013 B1 * | 1/2006 | Boyd | 370/352 |
| 7,142,657 B2 * | 11/2006 | Woodson et al. | 379/211.02 |
| 7,324,634 B2 * | 1/2008 | Hoy et al. | 379/133 |
| RE40,148 E * | 3/2008 | Burns et al. | 370/216 |
| 7,440,421 B2 * | 10/2008 | Abramson et al. | 370/259 |
| 2004/0190705 A1 * | 9/2004 | Taff et al. | 379/211.02 |
| 2007/0019559 A1 * | 1/2007 | Pittelli et al. | 370/248 |

* cited by examiner

*Primary Examiner*—Olisa Anwah

(57) ABSTRACT

An arrangement analyzes a plurality of call detail records from multiple sources and find those records related to multiple attempts to set up a particular user's call(s). The call detail records are filtered to establish an understanding of fault location likely to be responsible for what is deemed to be a defective call.

5 Claims, 6 Drawing Sheets

METHOD FOR PROVIDING DETECTION OF FAULT LOCATION FOR DEFECT CALLS IN A VOIP NETWORK

BACKGROUND

The invention generally relates to improving a caller experience in connection with a Voiceover Internet Protocol (VoIP) service. More specifically, the invention relates to deriving information from call detail records generated in the course of providing the service and providing predictive maintenance based on the information derived from the call detail records.

As the telecommunications industry has evolved over time, telephony services have been offered over different media. For the longest time, telephony services were offered over a network referred to as the Public Switched Telephone Network (PSTN). In today's Internet dominated communications world, there has been a migration to provide telephony capabilities over the Internet. This capability, referred to as Voice Over Internet Protocol or VoIP is growing in acceptance. A key aspect of the continued acceptance of VoIP as a plausible alternative to time tested telecommunications services is the assurance that the quality of service associated with the VoIP service will at least come close to, if not match, the quality of service metrics that are presently expected with regard to PSTN-based telephony services.

In the VoIP telecommunications domain, a number of errors may occur in connection with the provisioning of services (it is important for the service provider to detect actual faults or failures as quickly as possible.) It would also be beneficial, if at all possible, to act proactively with regard to certain issues within the network when traits or characteristics or metrics related to the quality of service indicate a trend to a need for maintenance prior to the occurrence of a failure which could be catastrophic.

In the VoIP arrangements that are known, call detail records are generated in connection with calls that are initiated on the network. These call detail records include various pieces of information regarding the call, including metrics which might be deemed to be related to the quality of the service associated with the given call. It would be beneficial if there was provided a system for harvesting the quality of service metrics which are available so as to enhance the predictive maintenance of the VoIP network.

SUMMARY

The invention monitors multiple call detail records generated by multiple network elements within a telecommunications network. A monitoring system analyzes the call detail records to assess whether a network event has occurred which warrants identification as an event for which maintenance operations are appropriate.

In one embodiment of such an arrangement, the technique determines the existence of a fault effecting a defective call and identifies a location of the fault. The technique determines whether a maintenance alert is warranted.

DETAILED DESCRIPTION

In accordance with an embodiment of the invention, an arrangement is provided in which multiple call detail records are collected or gathered from multiple network elements within a telecommunications network such as a VoIP network. The call detail records are analyzed so as to determine whether any correlations exist between certain ones of the call detail records thereby allowing a monitoring system to analyze the quality of service metrics associated with the call detail records and construct the more accurate and complete reflection of the quality of service that the network elements are providing. Various ones of the metrics can be used to detect different types of errors, faults, or failures. Additionally, the information derived from the call detail records may be reflective of trends in the operational capabilities of elements within the network whereby such trends might indicate that it would be valuable to perform some predictive maintenance with regard to such elements or system components. The types of errors or faults or failures that can be detected using the monitoring system include such things as a call loop event, a location of a fault responsible for defect calls in the network, and/or trunk failure occurrences in the network. Embodiments related to at least these three types of predictive maintenance types of issues will be described below.

Figure 1:
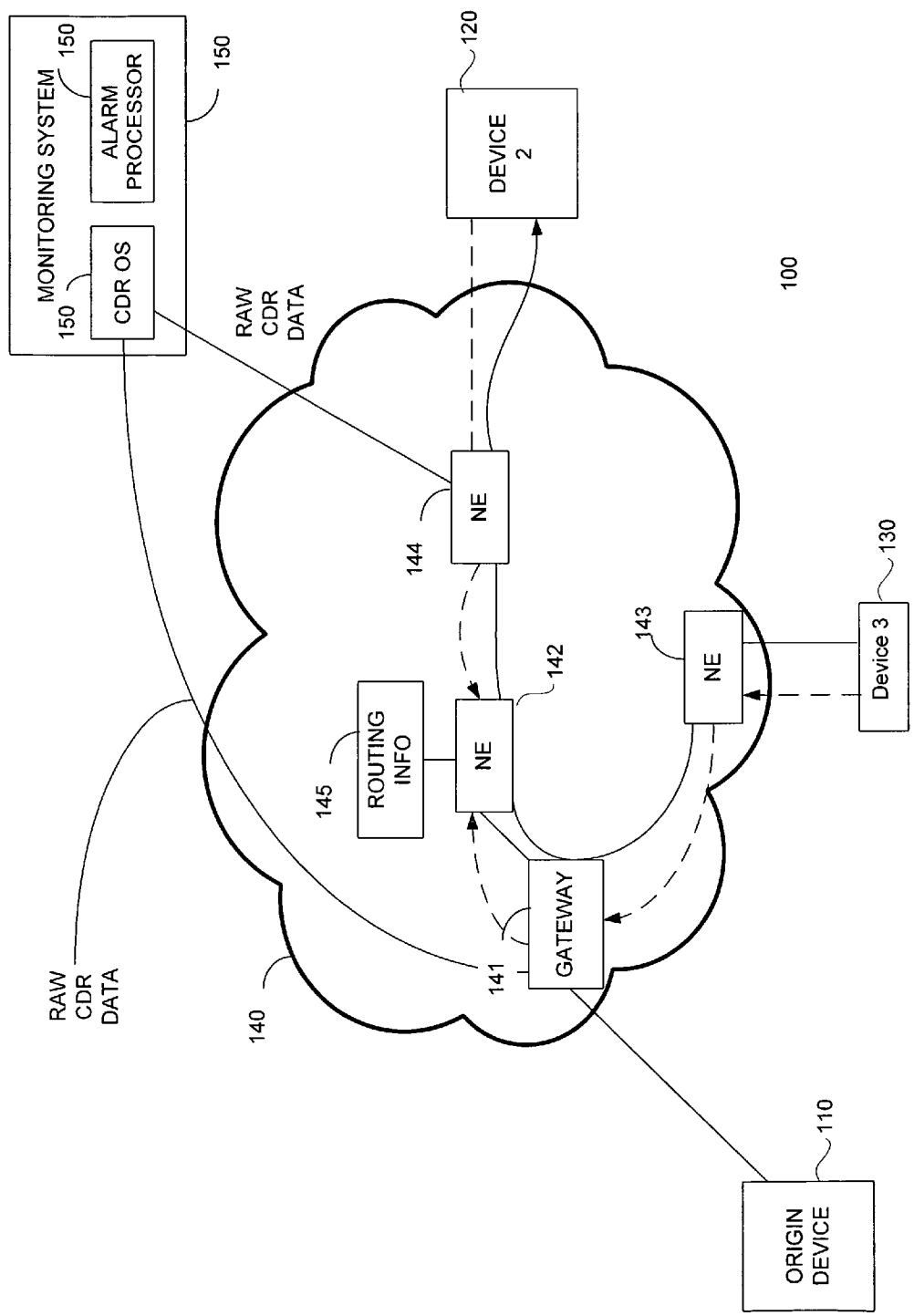
FIG. 1 is a block diagram illustrating a first arrangement arising in providing VoIP services.

FIG. 1 illustrates an embodiment in which the technique of the invention might be employed for detecting the occurrence of a Call Loop event. In the arrangement of 100, a call loop event occurs when an origin device 110 accesses the network via gateway 141. Using routing information from element 145, the call which is originally intended for device 2, is attempted to be set up through to device 2 via network elements 142 and 144. However, device 2 may have a subscriber who has selected a service which will attempt to find the user at a different device or devices if the primary device associated with the user is not answered within a predetermined time period. This functionality would then lead the device 2 to signal back to the network element. Alternatively, the network element 144 would detect a time-out in which the device had not responded. The network element then retrieves additional routing information with regard to where to direct the call. This is represented by the dashed line in FIG. 1. This dashed line suggests that network element 144 having retrieved routing information attempts to route the call then back through network element 142 to provide the solid line connection from network element 142 through the gateway back to network element 143 in an attempt to establish the call then to device 3, which is a secondary device associated with the subscriber. If it turns out, however, that the subscriber does not answer the call at device 3 either, it is possible for the system to enter into a loop where device 3 then attempts to route the call back to device 2. The two devices—device 2 and device 3—can then continue bouncing the attempted call back and forth between them creating the call loop which builds up traffic within the network without actually establishing a call. Resources are tied up for longer than they are actually needed or warranted, given the fact that neither device 2 nor device 3 is actually being answered and the call is not being set up.

In accordance with an embodiment of the invention, the call detail records of gateway 141 and gateway 144 are provided as raw call detail record data to a monitoring system 150. The monitoring system includes a plurality of processing modules which are shown here as separate elements but which could be combined in an integrated fashion as would be obvious to one skilled in the art. The raw CDR data from the respective network elements 141 and 144 are analyzed to assess whether there are any call detail records which are related to one another, that is, originate from attempts to build the same call. Element 144 captures the notion that origin device 110 has been attempting to establish a call through to device 2. As the call loop event occurs, multiple attempts then are made to establish the call from origin device 110 to device 2, 120. These multiple attempts are reflected in the call detail records forwarded by gateway 141 and by network element 144. The CDR notes these multiple attempts and determines that in all likelihood, given the frequency of the event, there is a call loop event transpiring in connection with the attempt to set up the call. This alarm or event occurrence detected by element 153 then is presented to an alarm processor 156. The alarm processor utilizes a rules-based-engine to determine how to process the call loop event alarm generated as a consequence of the analysis of the call detail records. If an alarm already exists with regard to that given call pair, that is origin device and device 2, then it may be possible that the alarm processor will simply suppress the alert resulting from this most recent detection of a call loop event. Alternatively, if no alarm exists with regard to a call loop event involving these two end devices, then the alarm processor may generate such an alarm and provide the alarm to a ticketing system not shown for generating a request to repair or investigate the system issue which is presented.

Figure 2:
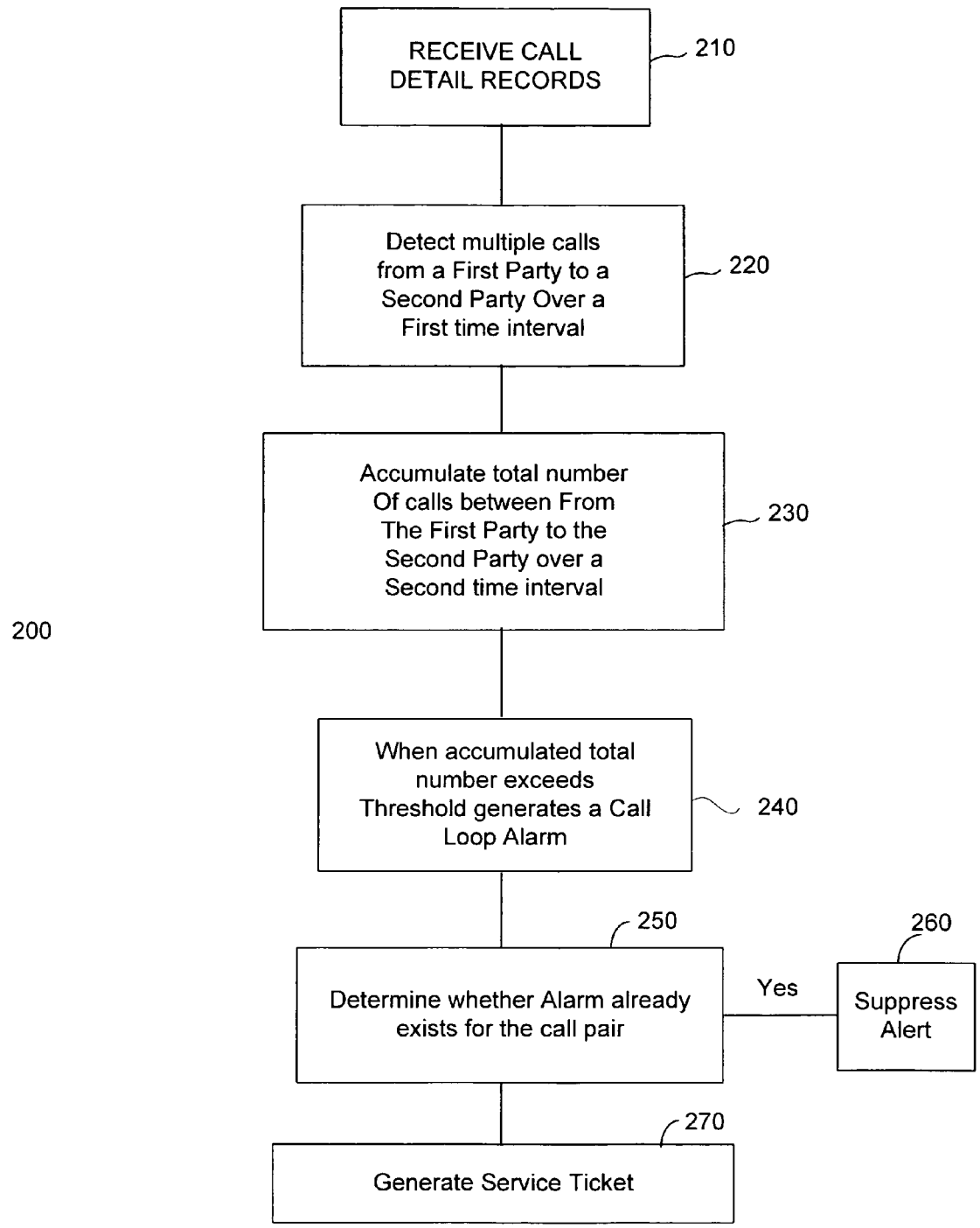
FIG. 2 is a flow diagram useful for explaining how an unfavorable event in FIG. 1 is detected.

FIG. 2 is a flow diagram useful for understanding the operation of the embodiment described with regard to FIG. 1. In the process 200, the monitoring system receives call detail records (210). In analyzing the multiple call detail records, the CDR OS detects multiple calls from a first party to a second party over a first time interval (220). The CDR OS notes that further investigation is necessary in view of this occurrence and then can tabulate or accumulate the total number of calls from the first party to the second party over a second time interval (230). When the accumulated total number of calls between the first party to the second party over the second time interval meets a certain criteria, such as exceeds a threshold previously established, then the system generates a call loop alarm (240). Once the call loop alarm is created, the alarm processor then can determine whether an alarm already exists for the call pair in process 250. If the alarm already exists for the call pair, then the alert can be suppressed (260). If, however, there has been no alarm previously generated for this call pair, then the alarm processor may generate a service ticket with regard to the alarm requesting that maintenance or customer services or operational groups further investigate the call loop event and attempt to result the underlying issues causing the event (270).

A second type of proactive maintenance or predictive maintenance information which would be of interest in the VoIP network relates to understanding whether a potential fault causing a defective call set up process originates on the edges of the network or within the VoIP network itself. This fault location detection can also be done utilizing the raw call detail records assembled from a multitude of network elements distributed throughout the service providers VoIP network.

Figure 3:
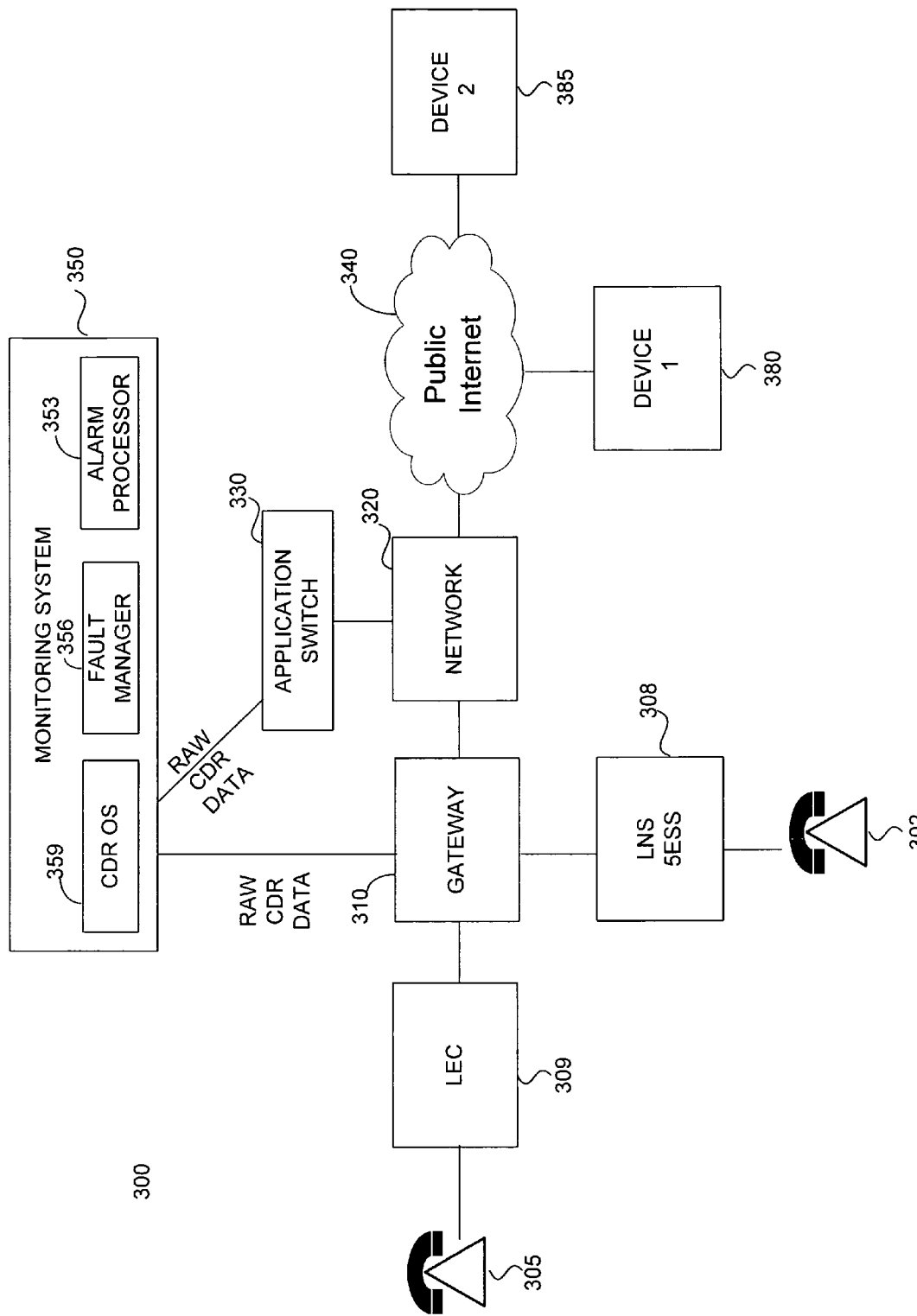
FIG. 3 is a block diagram illustrating an arrangement for using CDRs to detect fault locations.

In an arrangement shown in FIG. 3, multiple telephony units 305 and 307 are coupled, indirectly, to gateway 310 either through a local exchange carrier 309 or a local network service arrangement 308. As the gateway 310 attempts to establish any calls associated with these "off-net" telephony instruments, raw call detail record data are generated and provided to monitoring system 350. In addition, devices 1 and 2 (380 and 385) may be coupled to the public Internet 340 and through that public Internet be coupled to the service providers network 320 which includes an application switch which route calls across network 320 (see switch 330). The application switch or switches disposed throughout network 320 also generate raw call detail record data with regard to attempts to set up calls across the network. To the extent that the CDR OS and the monitoring system receive a plurality of call detail records from different sources relating to the same call set up request or operation, the CDR OS can correlate such call detail records to determine the sources of the respective call detail records and the metric information within the respective call detail records to assess which element, if any, within the VoIP network is responsible for problems in setting up the call. For instance, in a call to be set up between device 305 and device 385, the gateway may provide certain raw CDR data and the application switch 330 may also provide certain raw CDR data to the CDR OS 359. The call detail record will provide the CDR OS with an indication of where a fault might exist, for instance, at the gateway or at the application switch within the network, or perhaps neither which would suggest that some error in trying to set up the call is happening in the public Internet outside of the purview of the service provider.

Once the CDR OS has analyzed the information in the call detail records and drawn the appropriate correlations and inferences from those records, the CDR OS can generate an alert which would be processed by alarm processor 353 in a manner similar to that described with regard to FIG. 1. Shown explicitly in regard to the monitoring system of 350 is additional element 356, a fault manager. The alert could be forwarded to the alarm processor which could in turn trigger the fault manager to take action. Alternatively, the alert could be sent simultaneously to the fault manager and the alarm processor for parallel processing.

As in the first embodiment, while these modules are shown as individual modules in monitoring system 350, it is conceivable that these modules could be integrated together on the same processing platform and simply driven by functionality defined by separate portions of software or code so as to execute functionality necessary to achieve the goals of this particular embodiment. The processing platform in this embodiment as well as in FIG. 1 and in the following FIG. 5, can take the form of single processing arrangements or multiple processor arrangements so long as the processor control code is configured to appropriately execute the necessary instructions and coordinate the operations of the respective modules.

Figure 4:
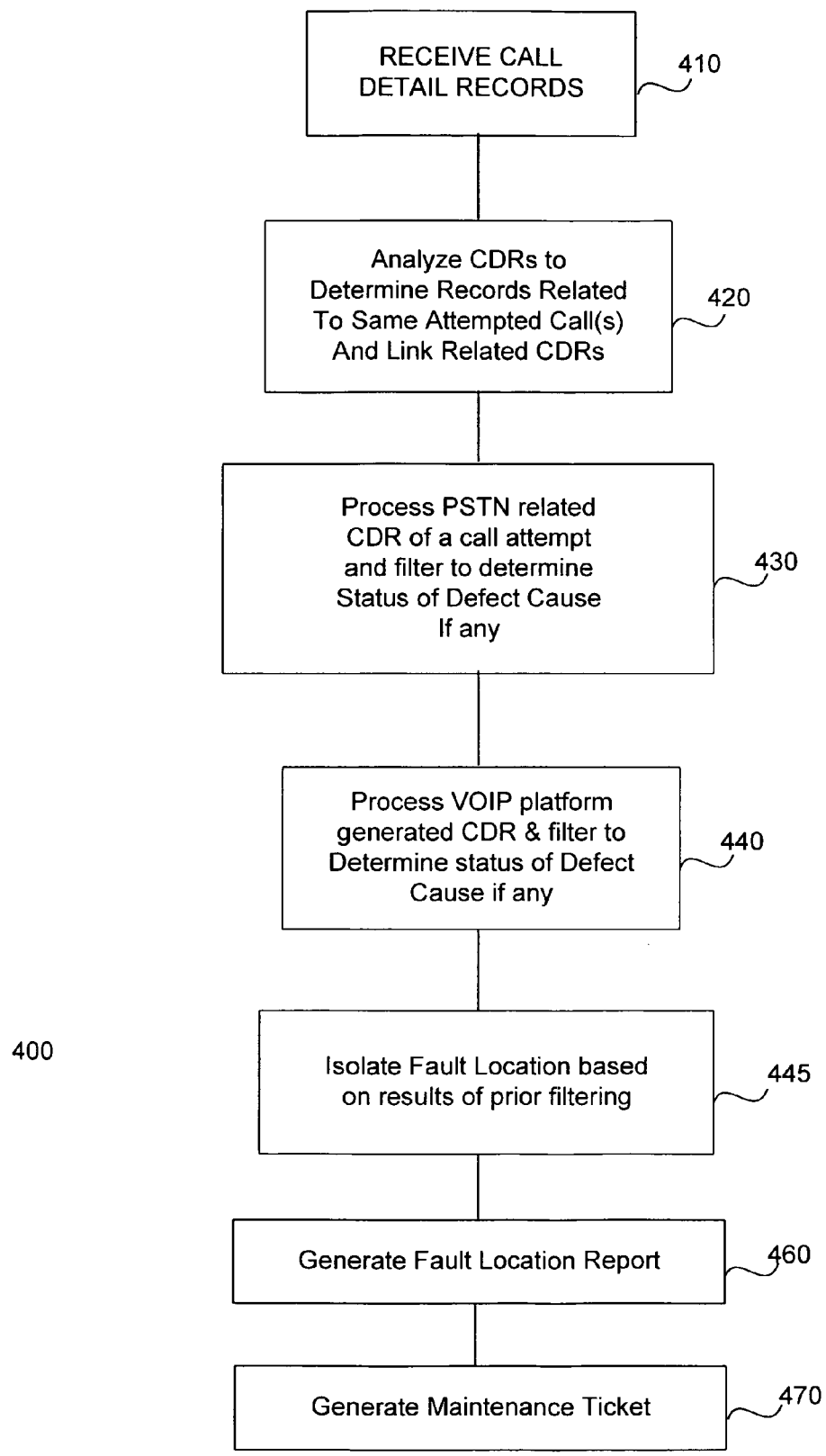
FIG. 4 is a flow diagram useful for explaining how an unfavorable event in FIG. 3 is detected.

FIG. 4 is a flow diagram useful for understanding the operations of the embodiment of FIG. 3. In process 400, the CDR OS receives call detail records (410). The monitoring system them analyzes these call detail records to determine records related to the same attempted call or calls, and links these related CDRs (420). The system then processes the respective CDRs to determine the status of the defect cause, if any, looking at the PSTN related CDR (430) and the VoIP platform generated CDR (440). These two steps could take place either simultaneously, concurrently or in a different order than that prescribed in FIG. 4 and still achieve the same effect of isolating a fault location based on the results of prior filtering as required by element 445. The system then can generate a fault location report (460) which could be forwarded on to or used by a fault manager as referred to in regard to FIG. 3. In addition, the system can generate a maintenance ticket (470).

In addition to the process shown in FIG. 4, it is possible that the alarm processor may also suppress the fault alert for the same reasons as the call loop event alarm was suppressed in connection with the embodiment of FIG. 1, namely that an alarm is already detected to have been generated and that this is simply another recurrence of that alarm or fault cause. In that case, it may be desirable not to overload the system with additional alarms. The alarm processor can use its rules based engine arrangement for determining that it is appropriate to issue the alarm based on the received alert and can determine what priority to associate with that alarm.

Figure 5:
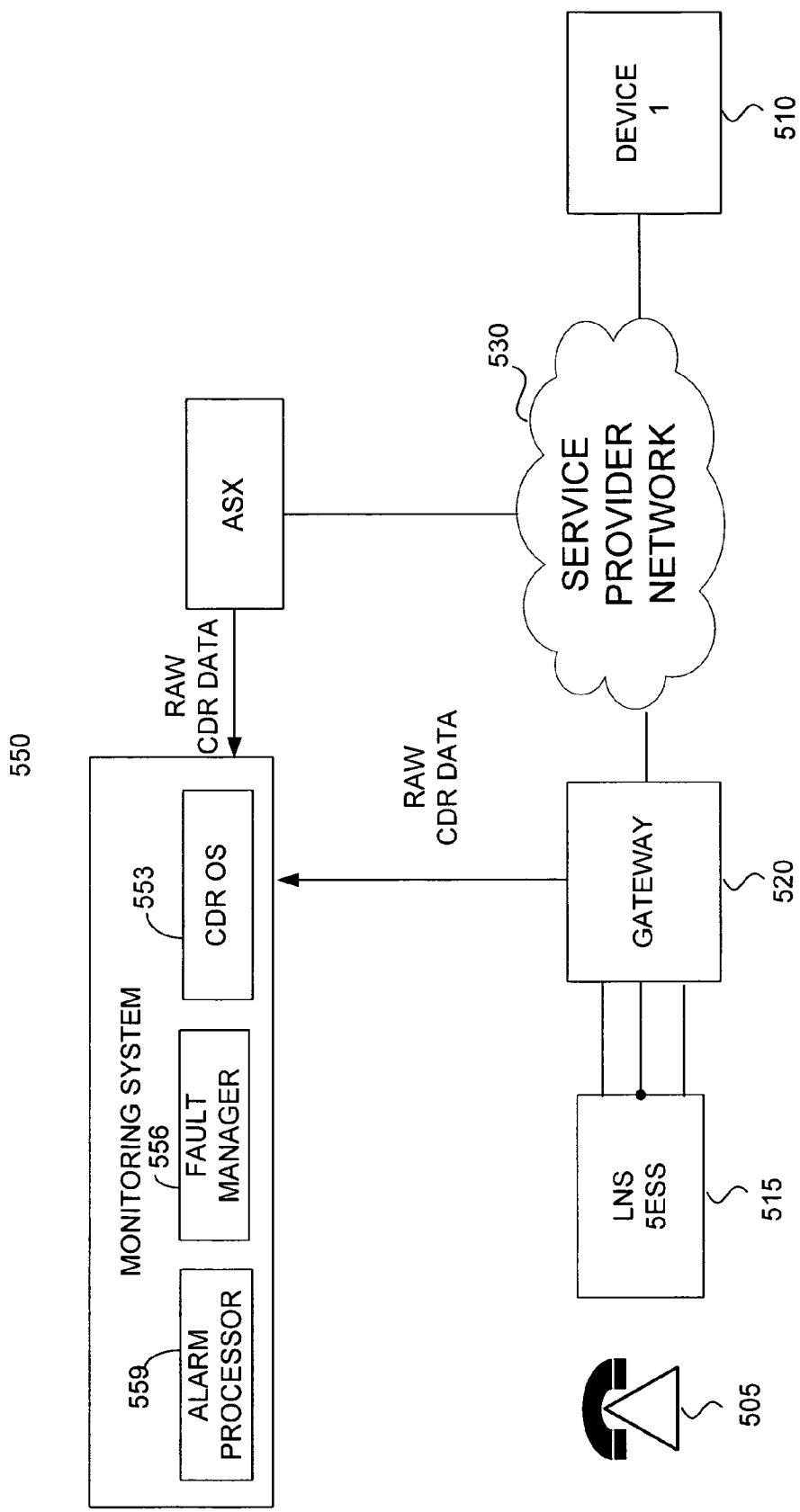
FIG. 5 is a block diagram illustrating an arrangement for using CDRs to predict trunk failures.

Yet another error fault issue which is detectible in connection with the arrangement of the present invention is a trunk failure issue (an illustration of the occurrence of this is set forth in FIG. 5 where the service provider network 530 provides access to device 1, 510 and access to device 505 via gateway 520 and local network service 515). Again, an element within the service provider network, here the switch ASX, along with the gateway element provide raw CDR data to the monitoring system 550. Again the CDR OS processes the call detail records to determine what codes, if any, are specifically related to a failed attempt to establish a call. The codes are defined so as to more specifically identify if a particular type of disconnect has occurred in the process of trying to set up the call and whether that particular type of disconnect has occurred more than a predetermined number of times. If so, then the CDR OS treats this unacceptable disconnect rate as a trunk failure associated with a trunk coupling the gateway 520 to the local network service 515. In that circumstance, the CDR OS, in a manner similar to that described above, then can generate an alert that can be processed by the alarm processor 559 and/or the fault manager 556 where by the services provider can take actions so as to address in a proactive fashion, a problem which appears to be arising from a connection or trunk arrangement associated with gateway 520. For instance, that trunk could be disabled with regard to the ports of gateway 520 and thereby no longer be selectable in regards to any communication between gateway 520 and LNS 515 until such time as the trunk arrangement has been checked and the failure has been eradicated.

Figure 6:
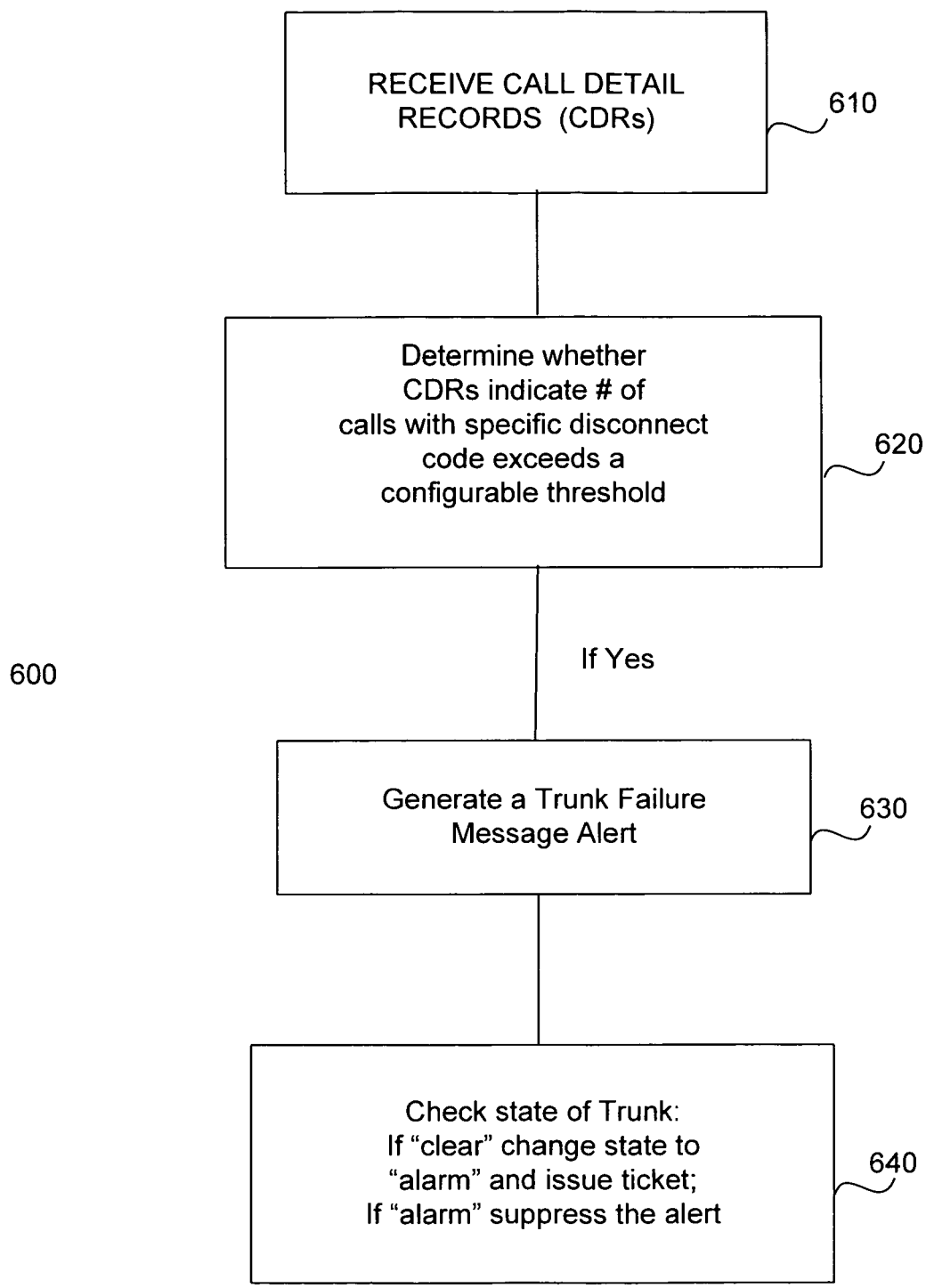
FIG. 6 is a flow diagram useful for explaining how an unfavorable event in FIG. 5 is detected.

FIG. 6 is a flow diagram useful for explaining the operations of the monitoring system of FIG. 5. In this process 600, the CDR OS as part of the monitoring system, receives the call detail records (610). The arrangement then analyzes the received CDRs to determine whether those CDRs indicate a number of calls having a specific disconnect code and then determines whether that number of calls exceeds a configurable threshold (620). If it turns out that the number of CDRs indicating the specific disconnect code exceeds the configurable threshold, then the CDR OS can generate a trunk failure message alert. This alert can be processed in a manner similar to that described above with regard to the fault manager and alarm processors of FIGS. 1, 3 and 5. In particular, there can be a further check of the state of the trunk and if the state of the trunk at present, that is at the time of the check, is designated as "clear" then the system can issue a change state request to change the state associated with the trunk to "alarm" and furthermore issue a maintenance ticket to follow up with regard to the issues concerning this particular error or failure detection. If however, the state of the trunk is already designated as "alarm" then the system has the flexibility to suppress the alert at this time, or to raise the priority level associated with the alert.

The instant application has described three potential error, fault or failure scenarios which can be detected or predicted based on quality of service metric information which appears in call detail records which are created upon the establishment or attempted establishment of calls across a VoIP network. These faults, errors, failures are determined in accordance with an analysis of all of the CDRs and a correlation of the contents of those CDRs to examine the quality of service metrics in those CDRs. Additional types of errors could be discovered in connection with call set up processes or call processing operations depending on the metrics presented in the call detail record.

CONCLUSION

While various embodiments of the invention have been described above, it should be understood that they have been presented by way of example only, and not limitation. For example although the above methods are shown and described above as a series of operations occurring in a particular order, in some embodiments, certain operations can be completed in a parallel fashion. In other embodiments, the operations can be completed in an order that is different from that shown and described above.

What is claimed is:

1. A method comprising:
    receiving a plurality of call detail records associated with a plurality of call attempts, wherein each of said plurality of call detail records refers to a record in which data for a call is recorded;
    identifying, for each call detail record, a source of the record;
    filtering each of said call detail records from said source that is a gateway with a first set of filter rules;
    filtering each of said call detail records from said source that is a voice over IP (VoIP) network switch in accordance with a second set of filter rules;
    processing a plurality of said call detail records that have been filtered to identify a location of a fault effecting a defect call.

2. The method of claim 1 further comprising:
    generating an alarm in connection with identification of a fault location;
    responsive to said alarm, generating a maintenance ticket associated with the fault location.

3. The method of claim 2 further comprising generating a service report related to the fault location and the defect call.

4. A method comprising:
    receiving a plurality of call detail records from a plurality of sources, wherein each of said plurality of call detail records refers to a record in which data for a call is recorded;
    correlating the call detail records to determine those records associated with multiple call attempts to a same customer;
    analyzing each associated call detail record with a processing routine dependent upon the source of the call detail record;
    determining, based on the analysis, that a fault is responsible for the multiple call attempts; and
    identifying a location of the fault based on the analyses.

5. The method of claim 4 further comprising:
    generating a maintenance request in connection with the identified fault location of the fault.

* * * * *